(12) United States Patent
Yang et al.

(10) Patent No.: US 9,534,102 B2
(45) Date of Patent: Jan. 3, 2017

(54) MACROMOLECULE-BASED CONDUCTIVE COMPOSITE MATERIAL AND PTC ELEMENT

(71) Applicant: Shanghai Changyuan Wayon Circuit Protection Co., Ltd., Shanghai (CN)

(72) Inventors: Quanquan Yang, Shanghai (CN); Zhengping Liu, Shanghai (CN); Yong Fang, Shanghai (CN); Yutang Liu, Shanghai (CN); Lifeng Liu, Shanghai (CN); Wei Wang, Shanghai (CN); Daohua Gao, Shanghai (CN); Xuan Gong, Shanghai (CN); Jun Wang, Shanghai (CN)

(73) Assignee: Shanghai Changyuan Wayon Circuit Protection Co., Ltd., Shanghai (CN)

( * ) Notice: Subject to any disclaimer, the term of this patent is extended or adjusted under 35 U.S.C. 154(b) by 201 days.

(21) Appl. No.: 14/369,919

(22) PCT Filed: Dec. 24, 2012

(86) PCT No.: PCT/CN2012/087264
§ 371 (c)(1),
(2) Date: Jun. 30, 2014

(87) PCT Pub. No.: WO2013/097664
PCT Pub. Date: Jul. 4, 2013

(65) Prior Publication Data
US 2014/0327513 A1    Nov. 6, 2014

(30) Foreign Application Priority Data

Dec. 31, 2011    (CN) .......................... 2011 1 0458800

(51) Int. Cl.
*H01C 7/10*    (2006.01)
*C08K 3/38*    (2006.01)
(Continued)

(52) U.S. Cl.
CPC . *C08K 3/38* (2013.01); *C08K 3/14* (2013.01); *H01C 7/008* (2013.01); *H01C 7/022* (2013.01);
(Continued)

(58) Field of Classification Search
CPC ......... H01C 7/008; H01C 7/022; H01C 7/025; H01C 7/028; H01C 17/02
(Continued)

(56) References Cited

U.S. PATENT DOCUMENTS

| | | | | |
|---|---|---|---|---|
| 6,358,438 | B1 * | 3/2002 | Isozaki ................... | H01C 7/02 252/500 |
| 6,452,476 | B1 * | 9/2002 | Handa ..................... | H01B 1/22 252/511 |

(Continued)

*Primary Examiner* — Kyung Lee
(74) *Attorney, Agent, or Firm* — Ware, Fressola, Maguire & Barber LLP (57) ABSTRACT

A macromolecule-based conductive composite material and a PTC element. The macromolecule-based conductive composite material comprises: a macromolecule base material, having a volume fraction of the macromolecule base material of 20%-75%; a conductive filler with a core-shell granule structure and dispersed in the macromolecule base material, having a volume fraction of 25%-80%; and a coupling agent, being a titanate coupling agent and accounting for 0%-5% of the volume of the conductive filler. The PTC element prepared by using the macromolecule-based conductive composite material comprises at least two metal electrode plates (12, 12'), a macromolecule-based conductive composite material (11) being closely combined with the metal electrode plates (12, 12'). The PTC element prepared from the macromolecule-based conductive composite material has the advantages of low room-temperature resistivity, outstanding weather durability, good voltage resistance and good resistor repeatability.

18 Claims, 1 Drawing Sheet

(51) Int. Cl.
　　　*H01C 17/02*　　　(2006.01)
　　　*H01C 7/02*　　　(2006.01)
　　　*C08K 3/14*　　　(2006.01)
　　　*H01C 7/00*　　　(2006.01)

(52) U.S. Cl.
　　　CPC .............. *H01C 7/025* (2013.01); *H01C 7/028* (2013.01); *H01C 17/02* (2013.01)

(58) Field of Classification Search
　　　USPC ....................................................... 338/22 R
　　　See application file for complete search history.

(56) References Cited

U.S. PATENT DOCUMENTS

| | | | | |
|---|---|---|---|---|
| 7,286,038 B1* | 10/2007 | Wang | ..................... | H01C 1/084 |
| | | | | 252/512 |
| 7,304,562 B2* | 12/2007 | Shirai | ................... | H01C 7/027 |
| | | | | 338/22 R |
| 7,382,224 B2* | 6/2008 | Wang | ..................... | H01C 7/027 |
| | | | | 219/548 |
| 8,536,973 B2* | 9/2013 | Lo | ............................ | H01C 7/13 |
| | | | | 338/22 R |
| 8,653,932 B2* | 2/2014 | Yang | ........................ | H01B 1/20 |
| | | | | 338/22 R |
| 9,147,509 B2* | 9/2015 | Chu | ..................... | H01C 1/1406 |

\* cited by examiner

MACROMOLECULE-BASED CONDUCTIVE COMPOSITE MATERIAL AND PTC ELEMENT

TECHNOLOGY FIELD

The invention refers to a kind of Macromolecule Based Conductive Composite Material and the PTC components be made from it, which with low room-temperature resistivity, outstanding weather durability, good voltage resistance and resistor repeatability.

TECHNOLOGY BACKGROUND

Macromolecule Based Conductive Composite Material is sensitive to the change of temperature, and can keep a low resistance at normal temperature, which means the resistance can rise to a very high point to break the circuit when over current or over voltage happens so that the electronic components can be protected. Thus the Macromolecule Based Conductive Composite Material can be connected to the circuit as the current sensor material. This kind of material has been widely used in the circuit protection components.

Macromolecule Based Conductive Composite Material generally is the composition of polymer and conductive filler. Conductive filler is macro evenly distributed in the mentioned Macromolecule Based Materials. Polymer generally is polyolefin and its' copolymer likes polythene or copolymer of ethylene and vinyl acetate, but conductive filler is usually carbon black, metal powder or conducting ceramic powder. Regarding the carbon black as conductive filler, because its' special structure of aggregates and the polar group on the surface can make a good adhesive properties, so the kind of composite material has a good stability in resistance. But carbon black with a limited conductive ability, so it cannot meet the requirement of low resistance. Regarding the Macromolecule Based Conductive Composite Material with conductive filler of mental power, it has a low resistance, but the mental powder is easy to oxidize, so the conductive composite material needs to be packed to protect from the increasing of resistance during the oxidation. However, the size of packed PTC components can't meet the demand of miniaturization. For reaching a low resistance and overcoming the defaults of oxidation, in the industry, metal carbide, metal nitride, metal silicate or metal boride ceramic powder (such as titanium carbide) are tend to be used as the conductive filler of low resistance Macromolecule Based Conductive Composite Material, what's more, this kind of materials have been great developed. But the proportion of metal carbide, metal nitride, metal silicate or metal boride ceramic powder is relatively big in the Macromolecule Based Conductive Composite Material, so the hard processing and poor distribution in polymer led to the resistance can't be further reduced.

Besides, the thickness of PTC components are made by metal carbide, metal nitride, metal silicate or metal boride ceramic powder is limited (like below 1.0 mm, 0.8 mm, 0.6 mm etc.), and the requirements of electrical conductivity can't be met when size be smaller (like 1210,1206,0805, 0603 etc.). Thus developing the conductive filler with lower resistivity and better oxidation resistibility is necessary.

CONTENTS OF INVENTION

The invention aims to solve a technical problem that is offering a Macromolecule Based Conductive Composite Material with good conductivity and dispersion of processing.

The invention also needs to solve another technical problem that is offering the PTC components that are produced by the Macromolecule Based Conductive Composite Material mentioned above. This kind of PTC components needs to have low room-temperature resistivity, outstanding weather durability, good voltage resistance and resistor repeatability.

The mentioned technical problem can be solved through the below technical scheme: a kind of Macromolecule Based Conductive Composite Material includes Macromolecule Based Material, conductive filler and coupling agent. Among it:

(a) The mentioned Macromolecule Based Materials are one kind of and the mixture of polythene, polypropylene, PVDF, Polyolefin elastomer, epoxy resin, ethylene-vinyl acetate copolymer, polymethylmethacrylate and ethylene-acrylic acid copolymer. It accounts for 20%~75% of volume fraction in the Macromolecule Based Conductive Composite Material. As to the percentage, 25%~70% is preferred, 30%~65% is better;

(b) Conductive filler with particles structure of core-shell type, which accounts for 25%~80% of volume fraction of the Macromolecule Based Conductive Composite Material. Its' particle diameter is 0.1 um~20 um, but 0.05 um~50 um is preferred, 0.1~20 um is better. What's more, the volume resistivity is under 0.03 Ωm, but 0.02 Ωm is preferred, 0.01 Ωm is better. The mentioned conductive filler is distributed in the Macromolecule Based Materials;

(c) Coupling agent accounts for 0.05%~5% of the volume of conductive filler. As to the percentage, 0.1%~5% is preferred, 0.5%~3% is better. The mentioned coupling agent is titanate, its' structural formula as below:

$(R_1O)_m$—Ti—$(OX—R_2—Y)_n$

In the structural formula, $R_1$ group is one of ethyl, propyl, butyl, amyl or their isomeride; X group is one of carboxyl, sulfo, sulfuryl, phosphate based, phosphite based; R2 group is one of hexyl, heptyl, octyl or their isomeride; Y group is one of acyloxy and amidogen; n is functionality of titanate. During the formula, $1 \leq m \leq 4$, $1 \leq n \leq 3$, m and n both are integer. The mentioned coupling agent is the mixture of one or some of titanate coupling agent of mono-alkoxy type, mono-alkoxy pyrophosphate type, chelate type, coordination type and quaternary ammonium salt type.

Concretely, the structures of coupling agent can be divided into 6 different functional areas:

I II III IV V VI $(R_1O)_m$—Ti—$(OX—R_2—Y)_n$

Functional area I is for coupling inorganic matter and titanium; functional area II is for transesterification and crosslinking; functional area III is for connecting the group that in the center of titanium; functional area IV is the long chain entanglement group of thermoplastic polymer; functional area V is the reactive group of thermosetting polymer; functional area VI is the functionality of titanate.

The Macromolecule Based Conductive Composite Materials can contain other components, such as antioxygen, radiation crosslinking agent (often called radiation promoter, crosslinking agent or cross linking promoter, like TAIC), coupling agent, dispersing agent, stabilizer, non-conductive filler (like magnesium hydroxide, calcium carbonate), combustion improver, arc inhibitor, etc. Those components generally account for 15% of the volume in the Macromolecule Based Conductive Composite Material, like 5% of the volume.

Base on the scheme described above, the mentioned particles structure of core-shell type consists of core, shell and interlayer:

The core consists of one of tantalum, zirconium, titanium, niobium, molybdenum, hafnium, tungsten, chromium or beryllium; the shell is made up of one of boride, nitride or silicide of core matter; the interlayer consists of one of boride, nitride or silicide of core matter. The molecular structure is different between the boride, nitride or silicide that makes up interlayer and the one that makes up shell.

The invention also offers a kind of Macromolecule Based Conductive Composite Material, which include:

Macromolecule Based Material that is one kind of or the mixture of polythene, polypropylene, PVDF, Polyolefin elastomer, epoxy resin, ethylene-vinyl acetate copolymer, polymethylmethacrylate and ethylene-acrylic acid copolymer. Among them, polythenes include High-density polyethylene, low-density polyethylene, linear low density polyethylene and ultrahigh molecular weight polyethylene, etc., which accounts for 20%~75% of the volume in the Macromolecule Based Conductive Composite Material. As to the percentage, 25%~70% is preferred, 30%~65% is better.

Regarding the diameter of conductive filler with particles structure of core-shell type, 0.05 um~50 um is preferred, 0.1 um~20 um is better; the volume resistivity is under 0.03 Ωm, but 0.02 Ωm is preferred, 0.01 Ωm is better. The mentioned conductive filler with particle structure of core-shell type consists of core, shell and interlayer, which accounts for 25%~80% of volume in the Macromolecule Based Conductive Composite Material, but 30%~75% is preferred, 35%~70% is better. The conductive filler distributed in the Macromolecule Based Material, among it:

The core consists of one of tantalum, zirconium, titanium, niobium, molybdenum, hafnium, tungsten, chromium or beryllium;

The shell is made up of one of boride, nitride or silicide of core matter;

The interlayer consists of one of boride, nitride or silicide of core matter. The molecular structure is different between the boride, nitride or silicide that makes up interlayer and the one that makes up shell.

According to the scheme, the boride is one of tantalum boride, tantalum diboride, vanadium boride, vanadium diboride, zirconium diboride, titanium diboride, niobium boride, niobium diboride, molybdenum boride ($Mo_2B$), molybdenum pentaboride(($Mo_2B_5$), hafnium diboride, tungsten boride, ditungsten boride, chromium boride, dichromium boride($Cr_2B$), chromium diboride or chromium triboride($Cr_5B_3$).

The mentioned nitride is one of tantalum nitride, vanadium nitride, zirconium nitride, titanium nitride, niobium nitride or hafnium nitride.

The mentioned carbide is one of tantalum carbide, vanadium carbide, zirconium carbide, titanium carbide, niobium carbide, molybdenum carbide($Mo_2C$), hafnium carbide, tungsten monocarbide, ditungsten carbide or trichromium dicarbide($Cr_3C_2$).

The mentioned silicide is one of tantalum disilicide, tantalum silicide ($Ta_5Si_3$), trivanadium silicide, vanadium disilicide, zirconium disilicide, titanium disilicde, titanium silicide($Ti_5Si_3$), niobium disilicide, molybdenum disilicide, hafnium disilicide, tungsten disilicide, trichromium silicide ($Cr_3Si$) or chromium disilicide.

The described Macromolecule Based Conductive Composite Material can contain other promoter, such as antioxidant, radiation cross-linking agent (usually be called irradiation accelerator, cross-linking agent or cross-linking accelerator, like Triallyl isocyanurate), coupling agent, dispersant, stabilizer, non-conductivity filler (like magnesium hydroxide and calcium carbonate), flame retardant, arc light inhibitor or other compositions. Those compositions are generally less than 15% of the volume in Macromolecule Based Conductive Composite Material, such as 10% of the volume.

The invention also will show the PTC components that produced by the Macromolecule Based Conductive Composite Material that mentioned above. The Macromolecule Based Conductive Composite Material plates are compounded tightly with the two metal electrode slices to form the polymer conductive composite material sheets. The metal electrode slices include one of nickel, copper, aluminum or zinc and their compounds, such as copper foil, nickel foil, nickel and copper single plated foil, nickel and copper double plated foil. The thickness of Macromolecule Based Conductive Composite Material plate is 0.01~3.0 mm, 0.05~2.0 mm is preferred. What's more, for processing easier, the plate is cut into single component with plane shape. The mentioned single component has two surfaces perpendicularing to the direction of electric. The thickness of metal electrode slices is less than 0.3 mm, less than 0.2 mm is preferred, less than 0.1 mm is better, likes 0.035 mm.

At the temperature of 25° C., the PTC component is with a volume resistivity lower than 0.1 Ω·cm, lower than 0.05 Ω·cm is preferred, lower than 0.02 Ω·cm is better, and it is also with outstanding weather durability, good voltage resistance, resistor repeatability and PTC strength. So, the PTC components produced with the composite material can get a very low resistance at the temperature of 25° C., such as 1.0 mΩ~10 mΩ.

The single component mentioned above is laminate structure of square, triangle, round, rectangle, annulus, polygon or other irregular shape.

The steps of producing the PTC components by the mentioned Macromolecule Based Conductive Composite Material are as below:

1) Putting the polymer material, conductive filler and additive (if have) into the mixing equipment like torque rheometer, internal mixer, open mill, single-screw extruder or double-screw extruder, stc. to mix and melt under the temperature that above polymer melting temperature. Then, through extrusion molding, compression molding or calendaring, the mixed polymer will be processed into Macromolecule Based Conductive Composite Material sheet with thickness 0.01~3.0 mm, thickness 0.05~2.0 mm is preferred, 0.1~1.0 mm is better for processing easier;

2) Compounding metal electrode slice on the two sides of polymer conductive composite material sheet. The way is to tightly press the electrode slice on the two sides of sheet by roller when the Macromolecule Based Conductive Composite Material sheet still in melting. The composite sheet can be processed into the surface mounted PTC devices by etching, laminating, drilling, copper deposition, tin plating, scribing and other series of PTC processing way. It also can be cut into single components and then connect it with other metal parts to process into strips of PTC components;

3) The way of cutting composite sheet into single components including any method that can isolate single components from composite products, such as punching, etching, scribing and laser cutting. The mentioned single component with plane shape means that it has two surfaces that perpendicular to the direction of current. What's more the distance between two surfaces is very close, it's at most 3.0 mm, if at most 2.0 mm will be preferred, at most 1.0 mm will be better, such as 0.4 mm.

4) The way of cross linking and heat treating to the mentioned PTC components can improve its' stability. Cross linking can be chemical cross linking or radiation cross-linking, for example, it can be realized with cross-linking promoter and the way of electron beam irradiation or Co60 radiation. The needed radiation dosages of PTC components are generally under 100Mrad, and 1~50Mrad is preferred, 1~20Mrad is better; heat treating can be annealing, heat cycle or high-low temperature cycle, such as the high-low temperature cycle under +85° C./−40° C. The mentioned temperature environment of annealing can be any temperature that below the decomposition temperatures of polymer materials, like the high temperature annealing with the temperature higher than the melting temperature of composite materials and the low temperature annealing with the temperature lower than the melting temperature of composite materials.

In the mentioned PTC components, the two mental electrode slices are tandem connected into the protective circuit by conductive components. The conductive parts, also be called other mental parts can be connected on the electrode slices through electroplating, electroless plating, printing, dipping, spot welding, reflow soldering or conductive adhesive so that to connect the PTC into circuit. The "mental components" includes any structural components that can conduct with mental electrode slices. It can be any shape, such as dot, line, band, sheet, column and other combined body. The mentioned base material of "mental components" can be any conductive metals and their alloy, like nicke, copper, aluminum, zinc and their alloy.

The mentioned PTC components as thermistor components or over protection components have low room-temperature resistivity, outstanding weather durability, good voltage resistance and resistor repeatability. Its' strength is very high. Under 25° C., the resistivity of PTC components will be lower than 0.02 Ω·cm.

The advantage of the Macromolecule Based Conductive Composite Material lies in the fact that it has good conductivity and processing dispersion. What's more, the PTC components that be made from the Macromolecule Based Conductive Composite Material are with a low room-temperature resistivity, and still have outstanding weather durability, good voltage resistance and resistor repeatability at the same time.

The further detailed explanations to the invention with the attached drawing are as below.

ILLUSTRATION

NO. EXPLANATION IN THE DRAWING

Figure 1:
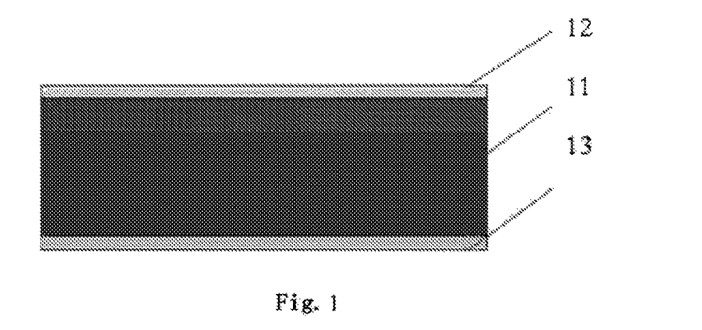
FIG. 1 is the structure schematic of the invented PTC components.
Figure 2:
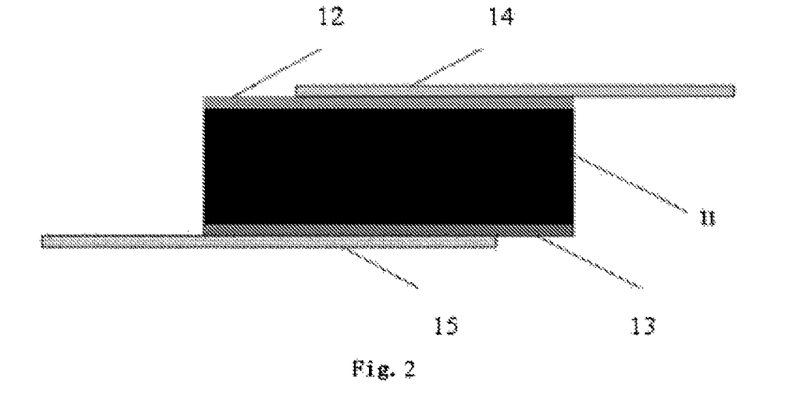
FIG. 2 is the structure schematic of the invented PTC components implementations.

11—Macromolecule Based Conductive Composite Materials;
12, 12'—metal electrode slices;
13, 13'—metal conductive components.
Concrete Implementing Ways Implementation No. 1~6 is the material mentioned in the invention with coupling agent Implementation No. 1

The conductive composite materials for producing PTC parts include:

(a) Macromolecule Based Material is High-density polyethylene, and the melting temperature is 134° C., density is 0.953 g/cm$^3$, volume fraction is 40%;

(b) The conductive filer is with the core-shell particles structure, and consists of the core, shell and interlayer. The shell is W2B, the interlayer is WB, and the core is metal tungsten. It's grain size is 2.0 um, and the volume fraction is 60%.

(c) Coupling agent is single alcoxyl based isopropyl di-oleic acid acyloxy titanate, the volume fraction accounts for the 0.5% of the volume in conductive filler, and the density is 0.976 g/cm$^3$.

Setting the internal mixer temperature at 180° C., speed at 30 rotation per minute, putting the polymer in it for mixing 3 minutes, and then adding the conductive filler to go on mixing 15 minutes, finally the Macromolecule Based Conductive Composite Material will be finished. The melted and mixed Macromolecule Based Conductive Composite Material was flattened by mill, and the Macromolecule Based Conductive Composite Material 11 with the thickness 0.2~0.25 mm is done.

The production process of PTC components is as below:

PIs refer to the drawing 1 (sketch of the PTC components mentioned in the invention), let's put the Macromolecule Based Conductive Composite Material 11 in the middle of the two symmetric metal electrode slices 12 and 12', then the metal electrode slices 12 and 12' will be tightly connected with the Macromolecule Based Conductive Composite Material through thermo compression bonding. The temperature of thermo compression bonding will be set at 180° C., at first to warm up 5 minutes, and next to hot press the materials 3 minutes with the press 5 MPa, then cold press it 8 minutes in the cold press machine, after that punching it into single component with 3*4 mm boy mould, at last jointing the two metal pins 13 and 13' on the surface of metal electrode slices 12 and 12', the PTC components are produced.

The electrical property of the PTC components in the implementation is as the attached chart No. 1.

Implementation No. 2

The steps of producing Macromolecule Based Conductive Composite Material and PTC components are the same with the implementation No. 1, but the proportion of the volume fraction of the coupling agent that in the conductive composite material is changed from 0.5% of the volume in the conductive filler to 1.0%.

The electrical property of the PTC components in the implementation is as the attached chart No. 1.

Implementation No. 3

The steps of producing Macromolecule Based Conductive Composite Material and PTC components are the same with the implementation No. 1, but the proportion of the volume fraction of the coupling agent that in the conductive composite material is changed from 0.5% of the volume in the conductive filler to 1.5%.

The electrical property of the PTC components in the implementation is as the attached chart No. 1.

Implementation No. 4

The steps of producing Macromolecule Based Conductive Composite Material and PTC components are the same with the implementation No. 1, but the proportion of the volume fraction of the coupling agent that in the conductive composite material is changed from 0.5% of the volume in the conductive filler to 2.0%.

The electrical property of the PTC components in the implementation is as the attached chart No. 1.

Implementation No. 5

The steps of producing Macromolecule Based Conductive Composite Material and PTC components are the same with the implementation No. 1, but the proportion of the volume fraction of the coupling agent that in the conductive composite material is changed from 0.5% of the volume in the conductive filler to 2.5%.

The electrical property of the PTC components in the implementation is as the attached chart No. 1.

Implementation No. 6

The steps of producing Macromolecule Based Conductive Composite Material and PTC components are the same with the implementation No. 2, but the used coupling agent is single alkoxy style isopropyl tri-oleic acid acyloxy titanate, and the additive amount accounts for 1.0% of the volume in conductive filler, density is 1.01 g/cm$^3$.

The electrical property of the PTC components in the implementation is as the attached chart No. 1.

$R_{100}$ means the resistance that is tested on the condition that PTC components be electrified (6V/50 A) 6 seconds, then be cut off the power 60 seconds, keeping the cycle 100 times, finally be placed at the temperature 25° C. for an hour.

$R_{100cycles}$ means the resistance that is tested on the condition that PTC components are put at the temperature of +85° C. for 30 minutes, and then be put at the temperature of −40° C. for 30 minutes, keeping the cycle 100 times, finally be placed at the temperature of 25° C. for an hour.

$R_{6V/50\,A}$ means the resistance that is tested on the condition that the PTC components withstand voltage for 2 hours under 6V, 50 A, then be placed at the temperature 25° C. for an hour.

$R_{12v/50a}$ means the resistance that is tested on the condition that the PTC components withstand voltage for 2 hours under 12V, 50 A, then be placed at the temperature 25° C. for an hour.

TABLE 1

| Implementation/Comparison | | Implementation 1 | Implementation 2 | Implementation 3 | Implementation 4 | Implementation 5 | Implementation 6 | Comparison 1 |
|---|---|---|---|---|---|---|---|---|
| Concentrition of resistance | $R_{min}$ (mohm) | 5.4 | 5.6 | 5.5 | 6.1 | 6.6 | 6.8 | 7.2 |
| | $R_{average}$ (mohm) | 6.6 | 6.5 | 6.0 | 6.7 | 7.0 | 7.6 | 8.4 |
| | $R_{max}$ (mohm) | 7.2 | 7.0 | 6.6 | 7.4 | 8.0 | 8.3 | 9.7 |
| | STDEV | 0.5 | 0.5 | 0.4 | 0.4 | 0.5 | 0.7 | 0.9 |
| Current resistance | $R_1$ | 7.6 | 7.8 | 7.2 | 7.6 | 7.9 | 8.8 | 9.6 |
| | $R_{100}$ | 18.3 | 18.6 | 16.7 | 19.5 | 20.4 | 22.3 | 27.8 |
| Weatherability | Heat cycle $R_{100\,cycles}$ (mohm) | 8.5 | 8.4 | 8.0 | 8.2 | 9.1 | 9.6 | 10.7 |
| Pressure resistance | $R_{6V/50A}$ (mohm) | 16.0 | 15.6 | 14.6 | 17.2 | 17.8 | 18.5 | 20.4 |
| | $R_{12V/50A}$ (mohm) | 18.6 | 19.0 | 18.8 | 20.1 | 22.4 | 24.1 | Breakdown |
| Processability | Torque (N · m) | 45.3 | 42.5 | 40.4 | 42.6 | 44.1 | 46.2 | 44.8 |

Comparison No. 1

The steps of producing Macromolecule Based Conductive Composite Material and PTC components are the same with the implementation No. 3, but the Macromolecule Based Conductive Composite Material is without any coupling agent.

The electrical property of the PTC components in the implementation is as the attached chart No. 1.

The $R_{min}$ in the table 1 means the resistance after soldering two metal pins 13 and 13' on the surface of the two metal electrode slices 12 and 12', which is the minimum resistance of 10 pcs PTC components;

$R_{average}$ means the resistance after soldering two metal pins 13 and 13' on the surface of the two metal electrode slices 12 and 12', which is the average value of 10 pcs PTC components;

$R_{max}$ means the resistance after soldering two metal pins 13 and 13' on the surface of the two metal electrode slices 12 and 12', which is the max value of 10 pcs PTC components.

STDEV means the standard deviation of 10 pcs PTC components, which reflected the discreteness of resistance.

R1 means the resistance that is tested on the condition that PTC components are electrified (6V/50 A) 6 seconds and then be placed at the temperature 25° C. for an hour.

From the table 1 we can see that the implementation 1~6 has the same volume fraction of crystalline polymer and conductive filler with the comparison, but the implementation 1~6 is added coupling agent, and the resistance of finished products is lower than the one without it. What's more the added one is with a lower discreteness, which means the coupling agent can help the conductive material to disperse in the polymer matrix. In the implementation 3, when it's with the same volume fraction of conductive filler, and the volume fraction of coupling agent comes to 1.5%, the PTC components are with the lowest resistance. The PTC components in Implementation 1~6 and in comparison 1 both can withstand the voltage of 6V, but the PTC components in implementation 1~6 can withstand the voltage of 12V, the one in the comparison can't, which means coupling agent can increase the pressure resistance of PTC components. The torque at the time of processing the Macromolecule Based Conductive Composite Materials showed us that the implementation 1~6 with a certain of coupling agent has a lower torque proportion than those without coupling agent, which means coupling agent can improve the shaping and processing ability of Macromolecule Based Conductive Composite Material.

In the implement 1~6, the conductive composite material that used by the PTC parts added the coupling agent that can improve the disperse state of conductive filler and can strengthen the conductive network of the composite material, thus the PTC parts have higher concentration of resistance. What's more, the conductive filler with core-shell structure is not easy to be oxidized, and needn't to protect the Macromolecule Based Conductive Composite Material by packing, thus the small size PTC components with the thickness 0.2 mm~2.0 mm and the current carrying area 1210, 1206, 0805, 0603 can be produced.

The below implements are without coupling agent, formula and performance will be showed in table 2.

Implement No. 7

The formula of Macromolecule Based Conductive Composite Material that for producing thermistor components is showed as table 2. In it, polymer 1 is high density polyethylene, it's melting temperature is at 134° C., density is 0.953 g/cm$^3$; conductive filler 1 is titanium carbide, its' Fisher particle size is 2.0 um, density id 1.93 g cm$^3$; conductive filler 2 is with core-shell structure, its' size is 2.0 um, the shell is W2B, the interlayer is WB, and the core is metal tungsten.

The productive processes of thermistor components are as below: Setting the internal mixer temperature at 180° C., speed at 30 rotation per minute, putting the polymer in it for mixing 3 minutes, and then adding the conductive filler to go on mixing 15 minutes, finally the Macromolecule Based Conductive Composite Material will be finished. The melted and mixed Macromolecule Based Conductive Composite Material was flattened by mill, and the Macromolecule Based Conductive Composite Material 11 with the thickness 0.2~0.25 mm is done.

The thermistor components mentioned in the invention are as drawing 1. Let's put the Macromolecule Based Conductive Composite Material 11 in the middle of the two symmetric metal electrode slices 12 and 12', then the metal electrode slices 12 and 12' will be tightly connected with the Macromolecule Based Conductive Composite Material through thermo compression bonding. The temperature of thermo compression bonding will be set at 180° C., at first to warm up 5 minutes, and next to hot press the materials 3 minutes with the press 5 MPa, then cold press it 8 minutes in the cold press machine, after that punching it into single component with 3*4 mm boy mould, at last jointing the two metal pins 13 and 13' on the surface of metal electrode slices 12 and 12', the PTC components are produced.

Figure 3:
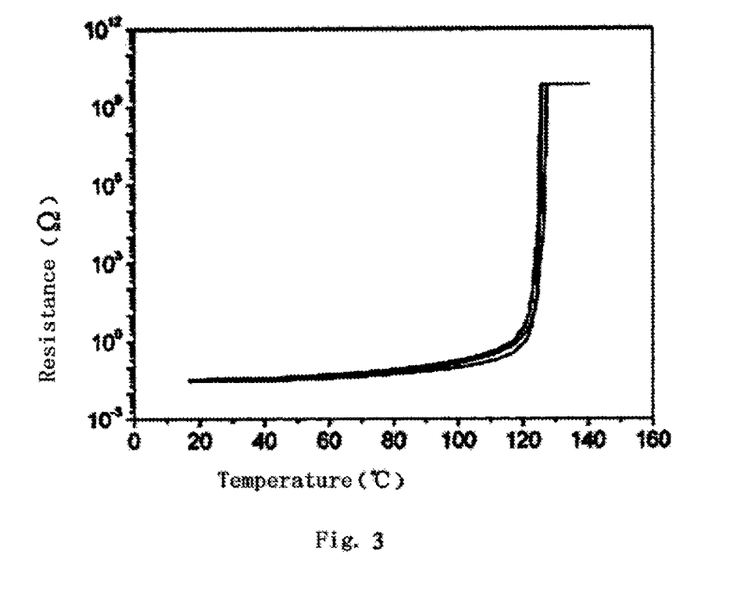
FIG. 3 is the resistance-temperature graph of the thermistor components of the implementation NO. 6.

Table 3 is the resistance-temperature graph of thermistor components in the implement. The resistance of thermistor components will be very low when it's at the temperature of 25° C., and the resistance will be higher an higher with the increasing of temperature. When temperature increases to 130° C. or so, the resistance of thermistor components will change suddenly, and increases about 10 order of magnitude. At this time, the thermistor components will change from conductor to insulator so that the circuit will be turn off to protect the circuit components.

Implement No. 8

The composition of Macromolecule Based Conductive Composite Material for producing thermistor components is the same with implement 7, and the formula of Macromolecule Based Conductive Composite Material and the electrical specification of thermistor components are as table 2, but the steps for producing Macromolecule Based Conductive Composite Material sheet and thermistor components are different. The steps are as below:

After flouring the polymer, put the flour into mixer to dry mix with conductive filler for 30 minutes, and then add the mixture into twin-screw extruder, after melting and mixing at the temperature of 180° C.~220° C., the mixture will be squeezed out and be granulated, then the granules of Macromolecule Based Conductive Composite Material are formed. The granules will be added into another twin-screw extruder, at the temperature of 180° C.~220° C., it will be squeezed out by extruder die head and turn into fused Macromolecule Based Conductive Composite Material sheet 11. The sheet 11 will be tightly connected with the upper and lower two symmetric metal electrode slices 12 and 12' through hot pressing by hot press roller. After that, the sheet will be cut into the core material with size 110*200 mm, and then the core material will be punched into single components with size 3*4 mm by modules, at last the two metal pins 14 and 15 will be soldered on the surface of upper and lower metal electrode slices 12 and 12' by reflow soldering to form the thermstor components.

Implement No. 9

The composition of Macromolecule Based Conductive Composite Material for producing thermistor components is the same with implement 7, and the formula of Macromolecule Based Conductive Composite Material and the electrical specification of thermistor components are as table 2, but the volume fraction of polymer 1 will be changed from 34% to 38%, and the volume fraction of conductive filler 2 will be changed from 60% to 56%.

Implementation No. 10

The composition of Macromolecule Based Conductive Composite Material for producing thermistor components is the same with implement 7, and the formula of Macromolecule Based Conductive Composite Material and the electrical specification of thermistor components are as table 2, but the volume fraction of polymer 1 will be changed from 34% to 38%, the volume fraction of polymer 2 will be changed from 6% to 10%, and the volume fraction of conductive filler 2 will be changed from 60% to 56%.

Comparison 2

The formula of Macromolecule Based Conductive Composite Material and the electrical specification of thermistor components are as table 2, and the steps on producing Macromolecule Based Conductive Composite Material and over current protection components are the same with the implementation 1, but the conductive filler 2 will turned to conductive filler 1.

Comparison 3 the formula of Macromolecule Based Conductive Composite Material and the electrical specification of thermistor components are as table 2, and the steps on producing Macromolecule Based Conductive Composite Material and over current protection components are the same with the implementation 1, but the conductive filler 2 will turned to conductive filler 1, the volume fraction of polymer 1 will be changed from 34% to 38%, and the volume fraction of conductive filler will be changed from 60% to 56%.

Comparison 4 the formula of Macromolecule Based Conductive Composite Material and the electrical specification of thermistor components are as table 2, and the steps on producing Macromolecule Based Conductive Composite Material and over current protection components are the same with the implementation 1, but the conductive filler 2 will turned to conductive filler 1, the volume fraction of polymer 1 will be changed from 34% to 38%, the volume fraction of polymer 2 will be increased from 6% to 10%, and the volume fraction of conductive filler will be changed from 60% to 52%. In it, the resistance of thermistor components is measured by four-probe method.

Results analysis: the resistance data in the table 2 are tested on the condition that the thermistor components that is made from the Macromolecule Based Conductive Composite Material mentioned in the invention are placed at the temperature of 25° C. for an hour after triggering in the condition of 6V/50 A.

The R in the table 2 means the resistance of thermistor components' two metal electrode slices 12 and 12' before being soldered the two metal pins 13 and 13' on their surfaces; $R_0$ means the resistance of thermistor components' two metal electrode slices 12 and 12' after being soldered the two metal pins 13 and 13' on their surfaces; $R_1$ means the resistance that is tested on the condition that PTC components are electrified (6V/50 A) 6 seconds and then be placed at the temperature of 25° C. for an hour. $R_{25}$ means the resistance that is tested on the condition that PTC components be electrified (6V/50 A) 6 seconds, then be cut off the power 60 seconds, and keep the cycle 25 times, finally be placed at the temperature 25° C. for an hour. $R_{50}$ means the resistance that is tested on the condition that PTC components be electrified (6V/50 A) 6 seconds, then be cut off the power 60 seconds, and keep the cycle 50 times, finally be placed at the temperature 25° C. for an hour. $R_{100}$ means the resistance that is tested on the condition that PTC components be electrified (6V/50 A) 6 seconds, then be cut off the power 60 seconds, and keep the cycle 100 times, finally be placed at the temperature 25° C. for an hour. $R_{100cycles}$ means the resistance that is tested on the condition that PTC components are put at the temperature of +85° C. for 30 minutes, and then be put at the temperature of −40° C. for 30 minutes, and keep the cycle 100 times, finally be placed at the temperature of 25° C. for an hour. (High temperature and humidity) $R_{1000h}$ means the resistance that is tested on the condition that PTC components are put in the environment of 85° C., 85% RH for 1000 hours and then be placed at the temperature of 25° C. for an hour. (High humidity) $R_{1000h}$ means the resistance that is tested on the condition that PTC components are put in the environment of 60° C., 95% RH for 1000 hours and then be placed at the temperature of 25° C. for an hour. Regarding the press resistance, 6V/50 A2H means the thermistor components withstand voltage for 2 hours in the condition of 6V, 50 A; 12V/50 A/2H means the thermistor components withstand voltage for 2 hours in the condition of 12V, 50 A; Pressure resistance is OK means the over current protection components do not burn and crack, NG means thermistor components burn or crack.

TABLE 2

| Implementation/Comparison | Implementation 7 | Implementation 8 | Implementation 9 | Implementation 10 | Comparison 2 | Comparison 3 | Comparison 4 |
|---|---|---|---|---|---|---|---|
| Composition (Volume percent) (%) | | | | | | | |
| Polymer 1 | 34 | 34 | 38 | 38 | 34 | 38 | 38 |
| Polymer 2 | 6 | 6 | 6 | 10 | 6 | 6 | 10 |
| Conductivity filler 1 | | | | | 60 | 56 | 52 |
| Conductivity filler 2 | 60 | 60 | 56 | 52 | | | |
| Electrical characteristic | | | | | | | |
| R (mohm) | 1.0 | 0.8 | 1.1 | 1.5 | 1.6 | 2.1 | 2.5 |
| $R_0$ (mohm) | 5.0 | 4.5 | 5.4 | 5.7 | 6.2 | 6.7 | 7.5 |
| $R_1$ (mohm) | 5.9 | 4.8 | 6.0 | 6.5 | 8.7 | 9.1 | 9.7 |
| $R_{25}$ (mohm) | 9.5 | 6.8 | 9.8 | 10.4 | 12.5 | 13.6 | 14.8 |
| $R_{50}$ (mohm) | 12.8 | 9.7 | 13.2 | 14.5 | 17.6 | 17.8 | 18.9 |
| $R_{100}$ (mohm) | 17.5 | 13.1 | 18.6 | 20.1 | 24.3 | 27.7 | 31.3 |
| Weather durability | | | | | | | |
| heat cycle $R_{100\ cycles}$ (mohm) | 8.5 | 6.0 | 12.0 | 12.8 | 18.7 | 20.6 | 24.7 |
| High temperature and humidity $R_{1000\ h}$ (mohm) | 7.8 | 6.6 | 8.6 | 9.2 | 9.4 | 7.3 | 8.5 |
| High humidity $R_{1000\ h}$ (mohm) | 7.2 | 6.0 | 7.9 | 8.6 | 7.8 | 8.2 | 8.6 |
| Pressure resistance | | | | | | | |
| 6 V/50 A/2 h | OK | OK | OK | OK | OK | OK | OK |
| 12 V/50 A/2 h | OK | OK | OK | OK | NG | NG | NG |

From table 2 we can see: implementation 7~8 and comparison 2; implementation 9 and comparison 3; implementation 10 and comparison 4, each of the group has the same volume fraction of conductive filler, but the conductive filler used in the implementation 7~10 is with the core-shell granule structure, the resistance of finished products that are made from this kind of filler is lower than the resistance of products with the conductive filler that is not core-shell granule structure but titanium carbide used in the implementation 2~4. The resistance tested in the implementation 7~10 is lower than the resistance tested in the implementation 2~4 after the thermistor components being punch 100 times by the current of 6V/50 A, which showed the good resistor repeatability.

The thermistor components in Implementation 7~10 and in comparison 2~4 all can withstand the voltage of 6V, but the thermistor components in implementation 7~10 can withstand the voltage of 12V, the one in the comparison 2~4 can't, which means that the thermistor components produced by the conductive filler with core-shell structure has good pressure resistance. From table 3 we can see that the thermistor components produced by the conductive filler with core-shell structure has good PTC strength (the mentioned PTC strength is the logarithm values of the max resistivity of samples in the resistivity-temperature graph and the resistivity of samples at the room temperature).

The thermistore components mentioned in the implementation 7~10 has low room-temperature resistivity, outstanding weather durability, good voltage resistance, excellent resistor repeatability and PTC strength, because it used the Macromolecule Based Conductive Composite Material that contained the core-shell structural conductive filler with low resistivity. What's more, the conductive filler with core-shell structure is hard to be oxidized, and needn't to protect the Macromolecule Based Conductive Composite Material by packing, thus the small size PTC components with the thickness 0.2 mm~2.0 mm and the current carrying area 1210, 1206, 0805, 0603 can be produced.

The invention's characteristics and contents are explained as above, but the explanation is still limited or just refers to some particular part, the invention's characteristic maybe will more than the contents that are mentioned in the paper. Thus the invention's protective range will not be limited in the contents of the implementation part, but should includes the combination of all the contents that showed in different part, and the various of replacement and embellishment that accord with the invention, which is covered by claims of the invention.

The invention claimed is:

1. A conductive composite material, comprising:
a polymer bases material; and
a conductive filler, wherein
the polymer base material is selected from the group consisting of polyethylene, polypropylene, polyvinylidene difluoride, polyolefin elastomer, epoxy resin, ethylene-vinyl acetate copolymer, polymethylmethacrylate, ethylene-acrylic acid copolymer and a mixture thereof,
the conductive filler comprises core-shell particles having a core made of a core material and a shell made of a shell material different from the core material wherein the polymer base material account for 20%~70% of volume fraction in the conductive composite material; and the conductive filler accounts for 25%~80% of volume fraction of the conductive composite material; and
the core material is selected from the group comprising of tantalum, zirconium, titanium, niobium, molybdenum, hafnium, tungsten, chromium and beryllium, and the shell material is selected from boride, nitride, carbide or silicide of the core material.

2. The conductive composite material according to claim 1, wherein the core-shell particles further comprise an interlayer, wherein the interlayer is made of boride, nitride, carbide or suicide of the core material, but different from the shell material.

3. The conductive composite material according to claim 1, wherein the boride, is one of tantalum boride, tantalum diboride, vanadium boride, vanadium diboride, zirconium diboride, titanium diboride, niobium boride, niobium diboride, molybdenum boride ($Mo_2B$), molybdenum pentaboride ($Mo_2B_5$), hafnium diboride, tungsten boride, ditungsten boride, chromium boride, dichromium boride($Cr_2B$), chromium diboride and chromium triboride ($Cr_5B_3$).

4. The conductive composite material according to claim 1, wherein the nitride is one of tantalum nitride, vanadium nitride, zirconium nitride, titanium nitride, niobium nitride and hafnium nitride.

5. The conductive composite material according to claim 1, wherein, the carbide is one of tantalum carbide, vanadium carbide, zirconium carbide, titanium carbide, niobium carbide, molybdenum carbide ($Mo_2C$), hafnium carbide, tungsten monocarbide, ditungsten carbide and trichromium dicarbide ($Cr_3C_2$).

6. The conductive composite material according to claim 1, wherein the silicide is one of tantalum disilicide, tantalum silicide ($Ta_5Si_3$), trivanadium silicide, vanadium disilicide, zirconium disilicide, titanium disilicde, titanium silicide ($Ti_5Si_3$), niobium disilieide, molybdenum disilicide, hafnium disilicide, tungsten disilicide, trichromium silicide ($Cr_3Si$) and chromium disilicide.

7. The conductive composite material according to claim 1, further comprising:
a coupling agent, wherein the coupling agent comprises one or more mixtures of titanate coupling agent, single-type alkoxy titanate coupling agent, single alkoxy pyrophosphate titanate coupling agent, chelate-type titanate coupling agent, coordination-type titanate coupling agent and quaternary ammonium salt type titanate coupling agent, and wherein the coupling agent accounts for 0.05%~5% of the volume of conductive filler, and wherein the volume conductivity of the conductive filler is less than 0.01 Ωm.

8. The conductive composite material according to claim 1, further comprising one or more of antioxidant agent, radiation cross-linking agent, dispersing agent, stabilizing agent, non-conductive filler, combustion resistant, and arc inhibitor.

9. The conductive composite material according to claim 8, wherein the non-conductive filler comprises one or both of magnesium hydroxide and calcium carbonate.

10. A positive thermal coefficient (PTC) element comprising:
a first electrode plate;
a second electrode plate spaced from the first electrode plate; and
a material layer disposed between the first electrode plate and the second electrode plate, wherein the material layer comprises the conductive composite material according to claim 1.

11. The PTC element according to claim 10, wherein the material layer has a thickness between 0.01 to 3.0 mm.

12. The PTC element according to claim 10, wherein the first electrode plate and the second electrode plate each is made of one of nickel, copper, aluminum, zinc and a compound thereof.

13. A method of producing a positive thermal coefficient (PTC) element, comprising:
mixing a polymer based material, and a conductive filler at a temperature higher than a melting temperature of the polymer based material for providing a mixed material in a melting state;
shaping the mixed material in the melting state into a layer, the layer has a first side and a second side; and
pressing a first electrode plate on the first side of the layer and pressing a second electrode layer on the second side of the layer while the mixed material is in the melting state; wherein
the polymer based material is selected from the group consisting of polyethylene, polypropylene, polyvinylidene difluoride, polyolefin elastomer, epoxy resin, ethylene-vinyl acetate copolymer, polymethylmethacrylate, ethylene-acrylic acid copolymer and a mixture thereof,
the conductive filler comprises core-shell particles having a core made of a core material and a shell made of a shell material different from the core material; and the core material is selected from the group comprising of tantalum, zirconium, titanium, niobium, molybdenum, hafnium, tungsten, chromium and beryllium, and the shell material is selected from boride, nitride, carbide or silicide of the core material.

14. The method according to claim 13, wherein said mixing comprises adding a coupling agent with the polymer based material and the conductive filler for providing the mixed material, the coupling agent comprising one or more mixtures of titanate coupling agent, single-type alkoxy titanate coupling agent, single alkoxy pyrophosphate titanate coupling agent, chelate-type titanate coupling agent, coordination-type titanate coupling agent and quaternary ammonium salt type titanate coupling agent, and wherein the polymer based material accounts for 20%~75% of volume fraction in the conductive composite material; the conductive filler accounts for 25%~80% of volume fraction of the conductive composite material; and the coupling agent accounts for 0.05%~5% of the volume of conductive filler.

15. The method according to claim 13, wherein the boride is one of tantalum boride, tantalum diboride, vanadium boride, vanadium diboride, zirconium diboride, titanium diboride, niobium boride, niobium diboride, molybdenum boride ($Mo_2B$), molybdenum pentaboride($Mo_2B_5$), hafnium diboride, tungsten boride, ditungsten boride, chromium boride, dichromium boride($Cr_2B$), chromium diboride and chromium triboride($Cr_5B_3$).

16. The method according to claim 13, wherein the nitride is one of tantalum nitride, vanadium nitride, zirconium nitride, titanium nitride, niobium nitride and hafnium nitride.

17. The method according to claim 13, wherein the carbide is one of tantalum carbide, vanadium carbide, zirconium carbide, titanium carbide, niobium carbide, molybdenum carbide ($Mo_2C$), hafnium carbide, tungsten monocarbide, ditungsten carbide and trichromium dicarbide ($Cr_3C_2$).

18. The method according to claim 13, wherein the silicide is one of tantalum disilicide, tantalum silicide ($Ta_5Si_3$), trivanadium silicide, vanadium disilicide, zirconium disilicide, titanium disiliede, titanium silicide($Ti_5Si_3$), niobium disilicide, molybdenum disilicide, hafnium disilicide, tungsten disilicide, trichromium silicide($Cr_3Si$) and chromium disilicide.

* * * * *